United States Patent
Ryu et al.

(10) Patent No.: US 12,049,714 B2
(45) Date of Patent: Jul. 30, 2024

(54) METAL NANOPARTICLES IMPREGNATED ACTIVATED CARBON FIBER FOR REMOVING HARMFUL SUBSTANCES, AND METHOD OF MANUFACTURING SAME

(71) Applicant: JEONJU UNIVERSITY OFFICE OF INDUSTRY-UNIVERSITY COOPERATION, Jeonju-si (KR)

(72) Inventors: Seung Kon Ryu, Daejeon (KR); Hong Gun Kim, Seoul (KR)

(73) Assignee: JEONJU UNIVERSITY OFFICE OF INDUSTRY-UNIVERSITY COOPERATION, Jeonju-si (KR)

( * ) Notice: Subject to any disclaimer, the term of this patent is extended or adjusted under 35 U.S.C. 154(b) by 688 days.

(21) Appl. No.: 17/179,452

(22) Filed: Feb. 19, 2021

(65) Prior Publication Data
US 2021/0254243 A1 Aug. 19, 2021

(30) Foreign Application Priority Data
Feb. 19, 2020 (KR) ........................ 10-2020-0020509

(51) Int. Cl.
*D01F 9/22* (2006.01)
*B01J 20/20* (2006.01)
(Continued)

(52) U.S. Cl.
CPC ................ *D01F 9/22* (2013.01); *B01J 20/20* (2013.01); *B01J 20/28023* (2013.01);
(Continued)

(58) Field of Classification Search
None
See application file for complete search history.

(56) References Cited

FOREIGN PATENT DOCUMENTS

| CN | 104772116 | * | 7/2015 |
| JP | 2016037404 | * | 3/2016 |

(Continued)

OTHER PUBLICATIONS

Machine Translation of CN104772116 (Year: 2015).*
(Continued)

*Primary Examiner* — Shawn McKinnon
(74) *Attorney, Agent, or Firm* — NSIP Law (57) ABSTRACT

The present disclosure relates to a metal nanoparticles impregnated activated carbon fiber for removing harmful substances, and a method of manufacturing the same. A method of manufacturing a metal nanoparticles impregnated activated carbon fiber for removing harmful substances according to the present disclosure includes an activation step of manufacturing an activated carbon fiber by heat-treating a precursor including a waste carbon fiber under a mixed atmosphere of activation gases including water vapor, carbon monoxide, nitrogen, argon, helium, or combinations thereof, and a metal containing step of containing metal in the activated carbon fiber. According to the present disclosure, a carbonization process is unnecessary since a precursor including the waste carbon fiber is used, and the metal nanoparticles impregnated activated carbon fiber may have remarkably improved adsorptive power compared to an activated carbon fiber with the same specific surface area by controlling the micropore distribution.

16 Claims, 4 Drawing Sheets

(51) Int. Cl.
- *B01J 20/28* (2006.01)
- *B82Y 30/00* (2011.01)
- *B82Y 40/00* (2011.01)
- *C01B 32/324* (2017.01)
- *C01B 32/336* (2017.01)
- *C01B 32/354* (2017.01)
- *D06M 11/83* (2006.01)
- *D06M 101/40* (2006.01)

(52) U.S. Cl.
CPC .......... *C01B 32/324* (2017.08); *C01B 32/336* (2017.08); *C01B 32/382* (2017.08); *D06M 11/83* (2013.01); *B82Y 30/00* (2013.01); *B82Y 40/00* (2013.01); *C01P 2004/64* (2013.01); *C01P 2006/16* (2013.01); *D06M 2101/40* (2013.01)

(56) References Cited

FOREIGN PATENT DOCUMENTS

| | | | |
|---|---|---|---|
| KR | 10-2009-0095725 A | | 9/2009 |
| KR | 20160045791 | * | 4/2016 |
| KR | 10-1897110 B1 | | 10/2018 |

OTHER PUBLICATIONS

Machine Translation of JP2016037404 (Year: 2016).*
Machine Translation of KR20160045791 (Year: 2016).*
Korean Office Action issued on May 26, 2021 in counterpart Korean Patent Application No. 10-2020-0020509 (5 pages in Korean).
Korean Office Action issued on Nov. 23, 2021 in counterpart Korean Patent Application No. 10-2020-0020509 (2 pages in Korean).

* cited by examiner

Comparative Example 1

Example 1

METAL NANOPARTICLES IMPREGNATED ACTIVATED CARBON FIBER FOR REMOVING HARMFUL SUBSTANCES, AND METHOD OF MANUFACTURING SAME

CROSS-REFERENCE TO RELATED APPLICATIONS

This application claims the priority of Korean Patent Application No. 10-2020-0020509 filed on Feb. 19, 2020, in the Korean Intellectual Property Office, the disclosure of which is incorporated herein by reference.

BACKGROUND

Field

The present disclosure relates to a metal nanoparticles-containing activated carbon fiber for removing harmful substances, and a method of manufacturing the same.

Description of the Related Art

In order to remove harmful substances, activated carbon and an activated carbon fiber are generally used in an adsorbent inside a health or military gas mask, an adsorption tower for removing the harmful substances such as hydrogen sulfide, chlorine gas, and nitrogen dioxide, or a water purification filter of a water treatment plant or a water purifier.

Although the harmful substances may be adsorbed through pores by using activated carbon when adsorbing the harmful substances, there is a problem that adsorption performance of activated carbon is lowered when activated carbon is used as an adsorbent for the gas mask or the adsorption tower since activated carbon not only lacks adsorption capacity, but also has low adsorption or desorption rate compared to the activated carbon fiber, activated carbon does not have a uniform surface area, and pores of activated carbon are diversely distributed from macropores to micropores so that there are many pores which are not suitable for the size of the harmful substances to be removed.

On the other hand, the activated carbon fiber has excellent adsorption rate since an activated carbon fiber may selectively adsorb specific substances by having a large specific surface area and a narrow ranged micropore size distribution, and the narrow range can be controlled depending on removing harmful subtances, and the activated carbon fiber has a low pressure drop as micropores formed in the activated carbon fiber are connected from the inside of the activated carbon fiber to the outer surface thereof. The adsorption mechanism of activated carbon fiber is the micropore filling which is so fast contrary to the diffusion mechanism of activated carbon which is very slow. In addition, the activated carbon fiber has a merit that adsorption ability is regenerated as most of the gas is desorbed when the gas is heated after adsorbing a gas.

There have been a number of attempts to use an activated carbon fiber by replacing activated carbon as in Korean Patent Registration No. 10-1419868. However, in a method of manufacturing an existing activated carbon fiber, it has been difficult to implement a manufacturing apparatus withstanding high temperature environments as the activated carbon fiber is manufactured under high temperature conditions by generally including performing an activation process of about 800° C. to 900° C. to expand the specific surface area, and there have been non-economic problems as high temperature carbonization and activation furnaces have to be maintained. On the other hand, there is a problem that, when an activated carbon fiber manufactured under relatively low temperature conditions are used to adsorb harmful substances, the active carbon fiber does not sufficiently adsorb the harmful substances as the active carbon fiber has a small specific surface area.

Accordingly, development of a manufacturing method of an activated carbon fiber capable of maintaining merits of the activated carbon fiber while lowering manufacturing temperatures have been required.

SUMMARY

An object of the present disclosure is to provide a manufacturing method of impregnating metal particles on a micropore size distribution-controlled activated carbon fiber and a micropore inlet.

A method of manufacturing a metal nanoparticles impregnatedmetal nanoparticles impregnated activated carbon fiber according to an aspect of the present disclosure may include: an activation step of manufacturing an activated carbon fiber having micropores formed therein by heat-treating a precursor including a waste carbon fiber under a mixed atmosphere of activation gases including water vapor, carbon dioxide, carbon monoxide, nitrogen, argon, helium, or combinations thereof; and a metal containing step of containing metal particles in the activated carbon fiber manufactured in the activation step.

In the activation step, the activation gases may include an oxidizing gas consisting of the water vapor and the carbon dioxide and a non-oxidizing gas consisting of the nitrogen, the argon, and the helium, and the oxidizing gas may be obtained by mixing the water vapor or the carbon dioxide with nitrogen or other inert gases at a volume ratio of 1:1 to 1:9.

In the metal impregnation step, the metal particles may be contained in the activated carbon fiber by mixing and reacting the activated carbon fiber to metallic oxide solvents. (ex, $Cu(NO_3)_2 \cdot 3H_2O$)

The metal-impregnated activated carbon fiber manufactured through the metal containing step may have micropores formed therein, and may be distributed so that the diameter distribution of the micropores satisfies a ratio range of a micropore diameter standard deviation ($\sigma$)/a micropore average diameter value (nm) of 0.07 to 0.1.

In the metal containing step, the metal may be contained in an amount of more than 3 parts by weight to less than 20 parts by weight based on 100 parts by weight of the activated carbon fiber.

In the metal containing step, the metal (nanoparticles) may include any one or more selected from the group consisting of silver, titanium, nickel, manganese, cobalt, zinc, yttrium, copper, vanadium, molybdenum, chromium, and iron.

A precursor manufacturing step of manufacturing the precursor by needle-punching the waste carbon fiber may be further included before performing the activation step.

In the metal containing step, nanoparticles of the metal may be contained in the activated carbon fiber from a metal salt solution.

A heat treatment step of the activated carbon fiber may be further included after performing the metal containing step.

In the activation step, the precursor may be heat-treated at a temperature of more than 600° C. to less than 900° C.

The waste carbon fiber may be at least one of a polyacrylonitrile-based waste carbon fiber, a cellulose-based waste carbon fiber, a pitch-based carbon fiber, or a phenolic resin-based waste carbon fiber.

The activation gases may further include carbon dioxide.

In the metal containing step, the metallic oxides may include any one or more selected from the group consisting of a nitrate (NO3-) of metal, a hydroxide salt (OH—) of metal, a chloride (Cl—) of metal, and a sulfate (SO42-) of metal.

A staple fiber-forming step (i.e. preparation of carbon fiber felt) of forming staple fibers by cutting and needle punching the waste carbon fiber.

The heat treatment step (oxidation step) may include oxidation of waste carbon fiber felt at a temperature of more than 200° C. to less than 300° C.

The heat treatment step (i.e. activation step) may be performed under the activation gases including the water vapor, carbon dioxide mixed to the inert gases including the nitrogen, the argon, the helium, or combinations thereof.

A metal nanoparticles impregnatedmetal nanoparticles impregnated activated carbon fiber according to another aspect of the present disclosure may be manufactured by the aforementioned method of manufacturing the metal nanoparticles impregnated activated carbon fiber, may have micropores having an average diameter of more than 0.5 nm to less than 2.0 nm formed therein, may be distributed so that the diameter distribution of the micropores satisfies a ratio range of a micropore diameter standard deviation (σ)/a micropore average diameter value (nm) of 0.07 to 0.1, and may contain particles of metal including any one or more selected from the group consisting of silver, titanium, nickel, manganese, cobalt, zinc, yttrium, copper, vanadium, molybdenum, chromium, and iron.

The metal nanoparticles impregnated activated carbon fiber may have a specific surface area of 1,000 $m^2/g$ to 2,000 $m^2/g$.

The metal particles may be contained in an amount of more than 3 parts by weight to less than 20 parts by weight based on 100 parts by weight of the activated carbon fiber.

A method of manufacturing a metal nanoparticles impregnated activated carbon fiber according to the present disclosure may include performing an activation process only as a carbonization step is unnecessary since a precursor including a waste carbon fiber is used, a metal nanoparticles impregnated activated carbon fiber may be manufactured by immersing the activated carbon fiber in a metallic oxide salt-dissolved solution, reacting the activated carbon fiber immersed in the metal salt-dissolved solution with metal particles to obtain a reaction product, taking out the reaction product, and performing a step of heat-treating the reaction product at a temperature of less than 400° C., and the metal nanoparticles impregnated activated carbon fiber manufactured through the heat treatment step may have remarkably improved adsorptive power of harmful substances contained in air or water as the micropore size distribution of the metal nanoparticles—containing activated carbon fiber is controlled to a desired size distribution.

BRIEF DESCRIPTION OF THE DRAWINGS

The above and other aspects, features and other advantages of the present disclosure will be more clearly understood from the following detailed description taken in conjunction with the accompanying drawings, in which:

FIG. 2B shows well distributed metal nanoparticles due to the uniformly distributed micropores.

DETAILED DESCRIPTION OF THE PREFERRED EMBODIMENT

Preferred embodiments of the present disclosure will be described in more detail, and descriptive parts that have already been known will be omitted or compressed for conciseness of the description.

Throughout the present specification, micropores mean pores with a diameter of about 2.0 nm or less. Furthermore, mesopores mean pores with a diameter of more than about 2.0 nm to not more than about 50 nm, and macropores mean pores with a diameter of more than about 50 nm.

Figure 1:
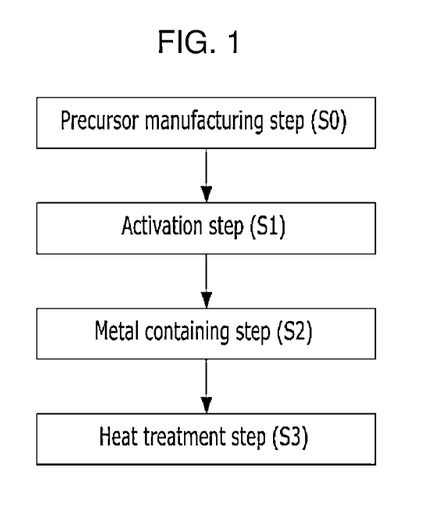
FIG. 1 is a flowchart showing a method of manufacturing a metal nanoparticle containing activated carbon fiber for removing harmful substances according to an exemplary embodiment of the present disclosure.

Referring to FIG. 1, an activated carbon fiber is manufactured to manufacture a metal nanoparticles impregnated activated carbon fiber (an activation step S1), the metal nanoparticles impregnated activated carbon fiber is manufactured (a metal containing step S2), and then desired metal particles are grown in a heat treatment step S3.

Specifically, the production rate of Cu, Cuo, or $Cu_2O$ nanoparticles on the surface of the activated carbon fiber varies depending on a treatment temperature when performing the heat treatment step S3 after separating $NO_3^{-1}$ or $SO_4^{-2}$ ions by immersing an activated carbon fiber in a [Cu$(NO_3)_2 \cdot 3H_2O$] or $Cu_2SO_4$ aqueous solution. It is possible to manufacture metal particles for desired purposes by controlling the temperature.

<Explanation of the Activation Step S1>

First, a precursor-activated activated carbon fiber is manufactured by heat-treating a precursor including a waste carbon fiber under a mixed atmosphere of activation gases including water vapor ($H_2O$), carbon dioxide ($CO_2$), carbon monoxide (CO), a non-oxidizing gas including nitrogen ($N_2$), argon (Ar), or helium (He), or combinations thereof in order to manufacture a metal nanoparticles impregnated activated carbon fiber (S1).

Although the activation gases may include an oxidizing gas and a non-oxidizing gas, the oxidizing gas may include water vapor ($H_2O$) or carbon monoxide (CO), and the non-oxidizing gas may include nitrogen ($N_2$), argon (Ar), or helium (He), the present disclosure is not limited thereto.

The activation step S1 is very sensitive to heat treatment temperature, residence time, and flow rate of the activation gases passing per unit area, and optimal activation conditions need to be derived. Such variables need to be analyzed and controlled in accordance with their uses by using a specific surface area measuring device in the activation step.

Activity of the oxidizing gas is improved so that the size distribution of micropores formed in the surface of the precursor may become relatively uniform by activating a precursor using the activation gases including the oxidizing gas and the non-oxidizing gas in the activation step S1 as described above.

The volume ratio of the activation gases may be adjusted to further uniformize the micropore size distribution. The activation gases may be obtained by mixing the oxidizing gas and the non-oxidizing gas at a volume ratio of 1:1 to 1:9. Micropores may not be sufficiently formed in an activated carbon fiber when the activation gases have a volume ratio of 1:9 or less, and carbon forming the activated carbon fiber may be excessively oxidized and disappeared as the oxidizing gas is excessive when the activation gases have a volume ratio of 1:1 or more.

Alternatively, water vapor and carbon monoxide (or carbon dioxide) in the oxidizing gas may be a gas in which the water vapor and carbon monoxide are mixed at a volume ratio of 1:1 to 1:9.

Micropores may not be sufficiently formed in the activated carbon fiber as water vapor is insufficient when the oxidizing gas has a volume ratio of 1:9 or less, and carbon forming the activated carbon fiber while forming macropores and mesopores may be excessively disappeared as water vapor is excessive when the oxidizing gas has a volume ratio of 1:1 or more.

However, such a mixing ratio may be changed in accordance with desired average diameter, production degree, distribution degree, and uses of the micropores, and is not limited to the above-mentioned numerical values.

When activating the precursor using such activation gases, an activated carbon fiber having micropores uniformly formed therein may be obtained. That is, the diameter distribution of micropores formed in the activated carbon fiber forms a normal distribution within a certain range as in an Example 1 graph of FIG. 3.

Specifically, about 90% of the whole micropores exists within a diameter value range corresponding to about 11% to 18% before and after the average diameter value of the micropores in micropores formed in the activated carbon fiber manufactured using the activation gases in the activation step S1. Namely, when 1.64 sigma range limit values are called X1 and X2, X1 and X2 satisfy the following expressions: $m-0.18\ m < X1 < m-0.11\ m$, $m+0.11\ m < X2 < m+0.18\ m$. To put it simply, it may be said that diameter coefficient of variation (CV) of the micropores calculated by a ratio of diameter standard deviation of the micropores ($\sigma$)/average diameter value of the micropores (nm) satisfies a range of about 0.07 to 0.1. It means that the larger the above-mentioned coefficient of variation (CV) is, the wider the diameter distribution of the micropores is, and the smaller the CV is, the diameter distribution is narrower and more uniform.

The higher a volume ratio of water vapor in the oxidizing gas of the activation gases is, the more the diameter coefficient of variation (CV) of the micropores is increased, and the lower the volume ratio of water vapor is, the more the diameter coefficient of variation (CV) of the micropores is decreased.

The diameter coefficient of variation (CV) of the micropores of the activated carbon fiber is appropriate in the above-mentioned range of 0.07 to 0.1.

The distribution of the micropores is relatively widened to deteriorate adsorption performance of a specific harmful substance although the formation of the micropores is easy as water vapor in the oxidizing gas has a mixing ratio (volume ratio of water vapor to carbon monoxide) of 1:1 or more when the diameter coefficient of variation (CV) of the micropores is 0.1 or more.

On the other hand, the lower the micropore coefficient of variation is, the more advantageous it is to remove the specific harmful substance. However, when the mixing ratio of water vapor in the oxidizing gas is lower than 1:9 in order to lower the diameter coefficient of variation to 0.07 or less, there is a problem that an average diameter of the micropores of the activated carbon fiber is also lowered, or the micropores are not sufficiently formed.

As such an activated carbon fiber having the micropores formed therein has a relatively uniformly formed diameter distribution, the activated carbon fiber has a high specific surface area, and as a large number of micropores with a size similar to diameter of a specific target harmful substance are formed in the activated carbon fiber, the activated carbon fiber may have remarkably improved selective adsorptive power of the harmful substance.

Although the average diameter value of the micropores set depending on harmful substances to be removed through the above-mentioned coefficient of variation varies, quality can be managed by apprehending whether the diameter of the micropores is relatively uniformly distributed or not.

Specific shape and average diameter of the micropores formed in the activated carbon fiber are not limited.

Carbon monoxide (CO) in the oxidizing gas may be replaced with carbon dioxide ($CO_2$).

Components other than carbon may be removed from the precursor through the activation step S1. Temperature, time, mixing ratio of each gas contained in the activating gases, etc. may be set differently depending on the desired grade of the activated carbon fiber or the size of the micropores.

Although, when performing a heat treatment process to a temperature of more than 600° C. to less than 900° C., i.e., a performance temperature of the activation step S1, a temperature increasing rate is not limited, the temperature increasing rate is preferably 0.5 to 10° C./min. A performance time of the activation step S1 may be considerably required, and a large amount of energy may be consumed when the temperature increasing rate is less than 0.5° C./min, and yield of the activated carbon fiber may be remarkably reduced when the temperature increasing rate is more than 10° C./min.

Furthermore, since adsorptive power is decreased as the specific surface area is decreased by incorporation of pores, and the like due to excessive activation of the activated carbon fiber at a temperature higher than 900° C., the temperature higher than 900° C. may not be preferable, and a rapid decrease in yield may occur on the whole at a temperature lower than 600° C.

Here, a waste carbon fiber contained in the precursor of the activated carbon fiber may come from an activated carbon fiber manufactured by including any one or more selected from the group consisting of a cellulose-based material, starch, coconut shell, citrus peel, orange peel, coffee grounds, and bamboo stem that are natural materials. However, the waste carbon fiber is not limited thereto.

In addition, the waste carbon fiber may come from activated carbon fibers manufactured by including any one or more selected from phenol resin, polyimide, polybenzimidazole, a polyvinylidene-based polymer, a polyacrylonitrile (PAN) based polymer, and a pitch-based carbon fiber. However, the waste carbon fiber is not limited thereto.

The polyvinylidene-based polymer may be any one or more selected from the group consisting of poly (vinylidene fluoride), poly (vinylidenefluoride-co-hexafluoropropylene), poly (vinylidene chloride-co-acrylonitrile), poly (vinylidene chloride-co-acrylonitrile-co-methyl methacrylate), poly (vinylidene chloride-co-vinyl chloride), and poly (vinylidene chloride-co-methyl acrylate).

When using such a waste carbon fiber, environmental pollution may be prevented by utilizing a waste carbon fiber discarded. Furthermore, the waste carbon fiber has an advantage of enabling the activated carbon fiber to be inexpensively manufactured as it is not necessary to perform an ultra-high temperature carbonization process, and inexpensive raw materials may be used since only an activation process of regenerating a waste carbon fiber that has already been manufactured through the carbonization process has to be performed by using a precursor containing an inexpensive waste carbon fiber.

<Explanation of the Metal Containing Step S2>

A metal nanoparticles impregnated activated carbon fiber is manufactured by containing metal in the activated carbon fiber manufactured through the activation step (a metal containing step S2).

The above-mentioned metal may be any one or more selected from the group consisting of silver (Ag), titanium (Ti), nickel (Ni), manganese (Mn), cobalt (Co), zinc (Zn), yttrium (Y), copper (Cu), and iron (Fe).

If metal is contained in an activated carbon fiber, the activated carbon fiber may act as a catalyst of improving a water purification function of removing or decomposing harmful substances of water and a purification function of removing or decomposing toxic harmful substances in the air, the activated carbon fiber may also serve as an adsorption point capable of selectively adsorbing a specific harmful substance onto the activated carbon fiber, and the activated carbon fiber may provide a function of anti-bacterializing various bacteria.

The metal nanoparticles impregnated activated carbon fiber may have a metal content of more than 3 parts by weight to less than 20 parts by weight, preferably more than 5 parts by weight to less than 10 parts by weight, based on 100 parts by weight of the activated carbon fiber.

However, such a weight ratio may be changed in accordance with desired size, production degree, distribution degree, and uses of the micropores, and is not limited to the above-mentioned numerical values. The more the metal content is increased, the more a harmful substance adsorption point of the manufactured activated carbon fiber may be increased. However, when the content becomes too much, the above-mentioned range is preferable since adsorptive power of the activated carbon fiber may be deteriorated as expression of the micropores is hindered, or the micropores are blocked.

Specifically, the metal particles may be contained in the activated carbon fiber by supporting metal particles on the surface of the activated carbon fiber and the micropores through a supporting process of mixing and reacting an activated carbon fiber and a metal salt in a solvent. Mixing and reaction times may vary as much as possible, and stirring may be carried out depending on the type of metal, temperature and concentration of a metal salt aqueous solution, and environmental requirements.

The solution preferably includes a solution having a metal salt concentration from 0.1 mol/L or more to a saturated concentration so that the above-mentioned content to be contained as a mole concentration may be adjusted. The concentration of the solution is not desirable as the metal nanoparticles impregnated amount is lowered although the mixing and reaction processes are proceeded for a long time when the solution has a concentration of less than 0.1 mol/L.

Furthermore, the metal salt may be any one or more selected from the group consisting of a nitrate ($NO_3^-$) of metal, a hydroxide salt ($OH^-$) of metal, a chloride ($Cl^-$) of metal, and a sulfate ($SO_4^{2-}$) of metal. However, the metal salt is not limited thereto.

The solvent may include distilled water, methanol, ethanol, or mixtures thereof.

After mixing and reacting the activated carbon fiber and the metal salt in the solvent so as to contain metal in the activated carbon fiber, residues may be removed through a heat treatment step of performing filtration, cleaning, and heating processes.

Alternatively, metal may be contained in the activated carbon fiber by mixing nanopowder of metal that is not a metal salt with the activated carbon fiber. Preferably, the metal nanopowder and the activated carbon fiber may be stirred and mixed in the solvent. The mixing time may vary as much as possible depending on the type of metal, temperature, and environmental requirements.

Metal particles may be embraced in the activated carbon fiber while adjusting the size of micropores, and residues such as the solvent may be removed through a heat treatment step of performing solvent cleaning and heating processes after mixing the activated carbon fiber with the metal nanopowder.

<Explanation of the Heat Treatment Step S3>

When using a metal salt in the metal containing step S2, the metal salt may be present in the form of desired metal particles in the activated carbon fiber by decomposing a compound such as the metal salt contained by the heat treatment step S3.

For example, when mixing and reacting a silver nitrate compound-containing solution and the activated carbon fiber so as to contain silver in the activated carbon fiber, the heat treatment step S3 is performed to decompose silver nitrate into silver, nitrogen, oxygen, nitrogen oxide ($NO_x$), etc.

The heat treatment step S3 may be performed under a mixed atmosphere of an inert gas including nitrogen, argon, helium, or combinations thereof so as to prevent oxidation of the contained metal.

The activated carbon fiber may be prevented from being oxidized and disappeared by carrying out the heat treatment step S3 under a mixed atmosphere of inert gases, thereby removing an oxygen gas.

Here, the heat treatment step S3 is carried out at more than 200° C. to less than 400° C. for 10 minutes to 2 hours. Although it is preferable to differently set up the above-mentioned temperature and time depending on the type of metal to be contained, it is sufficient to perform a heat treatment process at a temperature of more than 200° C. to less than 300° C. if the heat treatment step S3 is carried out for a long time.

When a metal salt is used by a metal containing method at low temperatures of 200° C. or less, decomposition of the metal salt does not occur. It is not preferable to carry out the heat treatment step S3 at the high temperatures since, when the activated carbon fiber is dried at high temperatures of 800° C. or more for a long period of time, carbon forming the activated carbon fiber may be reacted with a residual oxygen gas and excessively disappeared so that yield may be lowered, or average diameter, shape, and distribution chart of the micropores formed in the activation step S1 may be greatly influenced.

Meanwhile, the above-mentioned heat treatment step S3 may be applied as a step of enabling metal contained in the activated carbon fiber to be oxidized into a metal oxide by carrying out the heat treatment step S3 in the air, or under a mixed atmosphere of gases including activation gases of water vapor, nitrogen, argon, helium, or combinations thereof. The metal oxide may be contained in the activated carbon fiber by oxidizing the metal into the metal oxide, and the adsorption amount of the specific harmful substance may be improved by acting a basic metal oxide as a selective adsorption point of a specific harmful substance such as carbon dioxide. The manufacturing method is simplified as a step of oxidizing metal contained in a separate activated carbon fiber into a metal oxide through the above-mentioned heat treatment step S3 may be omitted.

Similarly, the heat treatment step S3 is carried out at more than 200° C. to less than 400° C. for 10 minutes to 2 hours. Although it is preferable to differently set up the above-mentioned temperature and time depending on the type of metal to be contained, it is sufficient to perform a heat treatment process at a temperature of more than 200° C. to less than 300° C. if the heat treatment step S3 is carried out for a long time.

However, oxidation of the metal does not occur at low temperatures of 200° C. or less, and it is not preferable to carry out the heat treatment step S3 at the high temperatures since, when the activated carbon fiber is dried at high temperatures of 800° C. or more for a long period of time, carbon forming the activated carbon fiber may be excessively disappeared.

A metal nanoparticles impregnated activated carbon fiber manufactured through the heat treatment step S3 may be used as a water purifier filter, a water purification plant filter, an automotive air conditioner filter, an adsorption tower filter of a power plant, an incinerator, etc., and the like.

<Explanation of the Precursor Manufacturing Step S0>

The precursor manufacturing step S0 may additionally include a staple fiber-forming step S01 of cutting the waste carbon fiber in accordance with the shape of a nonwoven fabric to form staple fibers if a waste carbon fiber is not a staple fiber.

Needle punching is referred to as a process of bonding waste carbon fibers by reciprocately passing a needle through a waste carbon fiber which has been formed of two or more overlapped staple fibers. A precursor that is a nonwoven fabric form may be manufactured while boundary surfaces forming respective layers are being irregularly entangled with one another through this needle punching.

The manufacturing step is simplified since it is not necessary to process the precursor into a separate nonwoven fabric form after the metal containing step S2 as a nonwoven fabric-type precursor is manufactured by passing through the above-mentioned precursor manufacturing step S0.

Alternatively, there may be a method of mixing and melt-spinning a metal nanopowder and a fiber-based material from the precursor manufacturing step S0 instead of passing through the metal containing step S2 as a method of containing metal.

After performing the melt spinning process, a nonwoven fabric-type precursor may be manufactured by passing through general oxidation and carbonization processes, and performing a needle punching process, and a metal nanoparticles impregnated activated carbon fiber may be manufactured by passing through the activation step S1, thereby containing metal in the activated carbon fiber right away. Preferably, the fiber-based material at this time may be a pitch-based material.

A nonwoven type metal nanoparticles impregnated activated carbon fiber manufactured through the above-mentioned manufacturing step may be used as a water purifier filter, a water purification plant filter, an automotive air conditioner filter, an adsorption tower filter of a power plant, an incinerator, etc., and the like.

Hereinafter, preferred Example and Comparative Example of the present disclosure will be described. However, the following Example is only a preferred embodiment of the present disclosure, and the present disclosure is not limited to the following Example.

Example 1. Manufacturing of a Metal Nanoparticles Impregnated Activated Carbon Fiber Example 1-1. Step of Preparing a Waste Carbon Fiber A used waste carbon fiber was manufactured through the following processes.

First, polyacrylonitrile (PAN) was produced by performing a solution polymerization process using acrylonitrile (AN, 95%, Daejung) and itaconic acid (IA, 99%, Junsei), and methyl acrylate (MA, 98%, Junsei) as monomers, and dimethyl sulfoxide (DMSO, 99%, Samchun) as a solvent.

A heat treatment process was performed to stabilize the produced PAN. After performing the heat treatment process, a low temperature carbonization process was performed at more than 700° C. to less than 900° C. The carbonized PAN was manufactured into a carbon fiber by passing through a high temperature carbonization process at more than 1,100° C. to less than 1,400° C. After mixing the manufactured carbon fiber with a binder such as epoxy resin or the like, the binder-mixed carbon fiber as a carbon fiber composite material is applied to industries. At this time, a waste carbon fiber is produced in the process of discarding the carbon fiber composite material used in the industries. The waste carbon fiber may be obtained by removing the binder from the carbon fiber composite material, and cutting the binder-removed carbon fiber composite material to an appropriate length of about less than 10 cm.

Example 1-2. Precursor Manufacturing Step S0

A precursor was manufactured by processing the foregoing waste carbon fiber prepared in Example 1-1 into a nonwoven fabric form through a needle punching process.

Example 1-3. Activation Step S1

After increasing temperature of the foregoing precursor of Example 1-2 to 800° C. in a temperature increasing rate of 2° C./min under a gas phase of injecting a carbon monoxide gas (1 L/min) and water vapor (9 L/min) as oxidizing gases, and a nitrogen gas (80 L/min) as a nonoxidizing gas, an activation step of regenerating the foregoing precursor of Example 1-2 into an activated carbon fiber was carried out at a temperature condition of maintaining a temperature of 600° C. to 900° C.

Micropores were formed in the activated carbon fiber of Example 1-2 through the activation step. Diameter and distribution of such micropores may be determined depending on types and mixing ratio of the oxidizing gases injected.

In micropores formed in an activated carbon fiber by using carbon monoxide and water vapor having a mixing volume ratio of 1:9 to 1:1 as the oxidizing gases, micropores within a diameter value range corresponding to about 11% to 18% before and after the average diameter value of the micropores were about 90% of the whole micropores. Namely, when 1.64 sigma range limit values are called X1 and X2, X1 and X2 satisfy the following expressions: m−0.18 m<X1<m−0.11 m, m+0.11 m<X2<m+0.18 m. To put it simply, it may be said that coefficient of variation (CV) of the micropore diameter, i.e., a ratio of diameter standard deviation of the micropores ($\sigma$)/average diameter value of the micropores (nm), satisfies about 0.07 to less than 0.1.

The activated carbon fiber was cooled by passing the activated carbon fiber manufactured through the activation step through a cooler of which water temperature was controlled to 30° C. to 40° C.

Example 1-4. Metal Containing Step S2

A silver nitrate ($AgNO_3$) aqueous solution was prepared so that 5 parts by weight of silver is contained in the foregoing activated carbon fiber of Example 1-3 based on the weight of the activated carbon fiber.

The activated carbon fiber and the silver nitrate ($AgNO_3$) aqueous solution were stirred, mixed, and reacted in a state that the foregoing activated carbon fiber of Example 1-3 was immersed in a silver nitrate ($AgNO_3$) aqueous solution with a saturated mole concentration at a room temperature condition for 1 to 10 hours.

Hereafter, water was removed from the immersed activated carbon fiber by using a vacuum pump.

Example 1-5. Heat Treatment Step S3

A silver-containing activated carbon fiber was finally manufactured by drying the activated carbon fiber to a temperature of 250° C. in an oven for 24 hours or more under a gas phase condition of injecting a nitrogen gas in a rate of 80 L/min so as to sufficiently remove water from the foregoing activated carbon fiber of Example 1-4 and allow metal to be sufficiently contained in the surface and micropores of the activated carbon fiber.

Comparative Example 1. Preparing a Commercial Activated Carbon Fiber with a Specific Surface Area of 1,100 m²/g An activated carbon fiber with a specific surface area of 1,100 m²/g among commercially available activated carbon fibers manufactured by KoTHmex was prepared. This was manufactured through the following manufacturing step.

First, PAN was oxidized at 240° C. to stabilize PAN. The oxidized PAN was carbonized at 1,000° C. Micropores were formed by activating the carbonized PAN at a temperature condition of 800° C. under an anoxic atmosphere. Hereafter, the activated carbon fiber of Comparative Example 1 was manufactured by cooling the micropore-formed PAN at room temperature.

Experimental Example 1. Measuring Physical Properties of the Activated Carbon Fibers Obtained in Example and Comparative Example After measuring physical properties of the activated carbon fibers obtained in Example 1 and Comparative Example 1 by the following methods, measurement results were shown.

Experimental Example 1-1. Comparison of Specific Surface Areas (m²/g)

After collecting activated carbon fibers obtained from Example 1 and Comparative Example 1 in an amount of less than 0.1 g, the collected activated carbon fibers were degassed at 300° C. for 12 hours until the residual pressure became $10^{-10}$ torr or less.

After this, adsorption amounts were measured by injecting each of the activated carbon fibers in an amount of less than 0.1 g under a liquid nitrogen atmosphere with a temperature of 77 K°, and using MicroActive ASAP 2460 equipment and using a nitrogen gas as an adsorbate.

After obtaining a graph by using Brunauer-Emmett-Teller equation with respect to adsorption amounts ranging from more than 0.1 to less than 0.3 of a nitrogen gas relative pressure (partial pressure/saturated vapor pressure), proportion constant C values and specific surface areas were measured from intercepts and slopes of straight lines.

Here, the activated carbon fiber of Example 1 had a specific surface area of about 1,500 m²/g, and the activated carbon of Comparative Example 1 had a specific surface area of about 1,100 m²/g.

Experimental Example 1-2. Checking a Metal Content (Parts by Weight)

As a result of ashing the whole carbon of the activated carbon fiber by heat-treating a partial sample of a silver-containing activated carbon fiber that is Example 1 at 550° C. for 2 hours or more, the mass of silver was measured and checked from a residual ash. As a result, a silver content of Example 1 was 5 parts by weight based on 100 parts by weight of the activated carbon fiber.

Experimental Example 1-3. Checking a Micropore Size Distribution

Figure 2A:
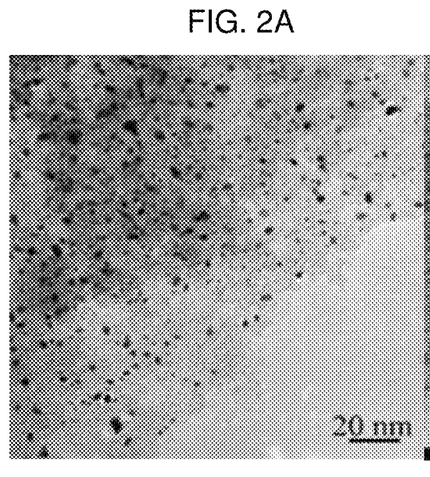
FIG. 2A is a photograph of a transmission electron microscope (TEM) of activated carbon.
Figure 2B:
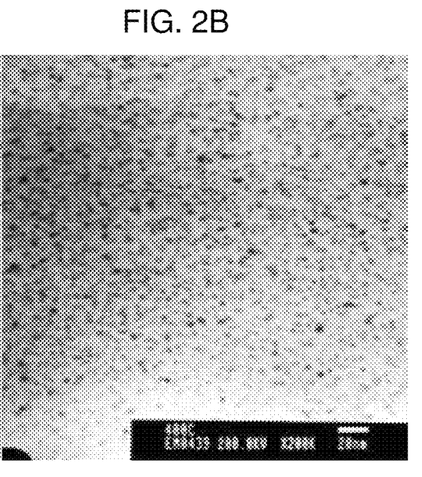
FIG. 2B is a photograph of a transmission electron microscope (TEM) (20 nm), in which metal nanoparticles are impregnated on an activated carbon and activated carbon fiber manufactured by metal nanoparticles impregnation method.

FIG. 2A is a photograph of an electron microscope of activated carbon, and FIG. 2B is a photograph of a transmission electron microscope (TEM) (20 nm) in which metals are impregnated on an activated carbon fiber manufactured by a method of manufacturing a metal nanoparticles impregnated activated carbon fiber for removing harmful substances according to an exemplary embodiment of the present disclosure.

It may be checked that much smaller nano-sized metal particles are much more uniformly distributed in the activated carbon fiber of FIG. 2B than the activated carbon of FIG. 2A. This is because pores developed in the active carbon fiber are uniform micropores.

Namely, small metal nanoparticles are uniformly distributed in the activated carbon fiber, but the activated carbon has portions where the metal nanoparticles have uneven sizes and are agglomerated. This is because almost all of the pores developed in the active carbon fiber are micropores of 2.0 nm or less, but pores developed in the activated carbon include many mesopores of 2.0 nm or more.

Experimental Example 1-4. Checking a Micropore Diameter Distribution

Figure 3:
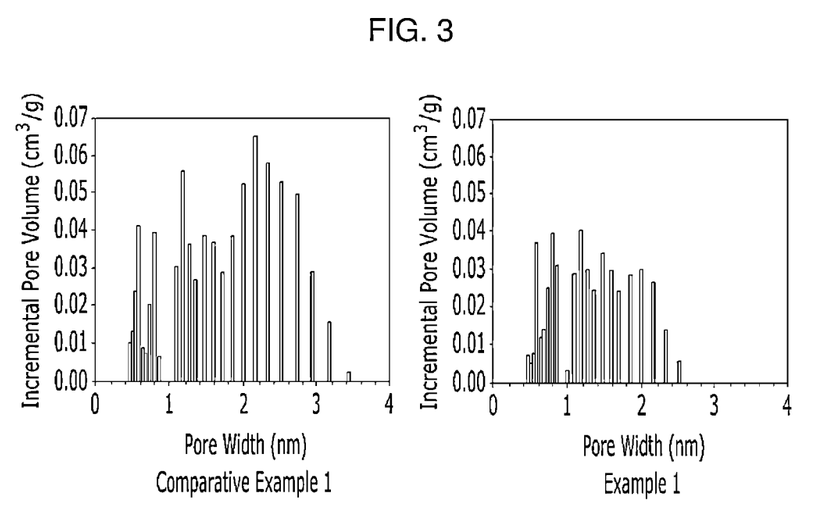
FIG. 3 is graphs showing micropore diameter distributions of a metal nanoparticle impregnated activated carbon fiber manufactured by a method of manufacturing a metal nanoparticles impregnated activated carbon fiber for removing harmful substances according to an exemplary embodiment of the present disclosure.

Referring to FIG. 3, results of measuring size distribution charts of pores developed in the activated carbon of Comparative Example 1 and the activated carbon fiber of Example 1 using MicroActive ASAP 2460 equipment were illustrated. As a result, it can be seen that pores developed in the activated carbon fiber are much smaller micropores as average diameters of micropores of Comparative Example 1 that is the activated carbon and Example 1 that is the activated carbon fiber are 2.2 nm and 1.7 nm respectively.

That is, micropores within a range corresponding to about 11 to 18% before and after the average diameter value accounted for about 90% or more of the whole micropores in case of Example 1 of which pores have a size distribution of 0.5 to 2.4 nm. Example 1 had a ratio of diameter standard deviation of the micropores ($\sigma$)/the average diameter value of the micropores (nm) of about 0.08. On the other hand, there was a phenomenon that the metal nanoparticles have an uneven distribution and are agglomerated as shown in FIG. 2A since Comparative Example 1, as pores with a size distribution of 0.5 to 3.2 nm, accounts for about 15% of a proportion of mesopores of which diameters are larger than less than 2.0 nm, i.e., the criterion of micropores. Comparative Example 1 had a ratio of diameter standard deviation of the micropores ($\sigma$)/the average diameter value of the micropores (nm) of about 0.18.

Experimental Example 2. Checking Effects of Removing Harmful Substances of Activated Carbon Fibers Experimental Example 2-1. Toluene ($C_7H_8$) Adsorption Experiment The following experiment was carried out to check effects of removing harmful substances with respect to the activated carbon fibers obtained in Example 1 and Comparative Example 1. An adsorption process was performed by continuously supplying toluene ($C_7H_8$) until micropores were saturated with respect to the activated carbon fibers obtained in Example 1 and Comparative Example 1.

At this time, the discharge amount of an organic solvent was examined by allowing wastewater passing through an adsorption-desorption reactor to be directly flown out to a COD measuring instrument without passing through a condensation tank.

The adsorption breakthrough curve was examined with respect to each of the concentrations by flowing out the organic solvent while maintaining an outflow concentration of toluene ($C_7H_8$) as the organic solvent to 200 ppm, and constantly maintaining the initial concentration $C_0$ thereof.

Each of the activated carbon fibers of Experimental Examples 1 and Comparative Example 1 was filled in an amount of 2.2 g in the adsorption-desorption reactor, and the adsorption-desorption reactor was operated at room temperature (25° C.). Meanwhile, the organic solvent in wastewater was allowed to be transported in a rate of 2 L/min by using a metering pump.

Specifically, a result of measuring a value obtained by dividing an outlet concentration by time of wastewater passing through an adsorption reactor of toluene by an outflow concentration of toluene was expressed as a breakthrough curve.

A ratio value of the outlet concentration to the outflow concentration of 0 represents that toluene ($C_7H_8$) is completely adsorbed and removed, and a ratio value of the outlet concentration to the outflow concentration of 1 means a saturated adsorption state that toluene ($C_7H_8$) may not be further adsorbed and removed. The time reaching this saturated adsorption is referred to as an adsorption breakthrough point.

The results of this experiment are shown in FIG. 3. As seen in the above-mentioned physical property Experimental Examples, both Experimental Example 1 and Comparative Example 1 have an average diameter value of 1.7 nm. However, most of micropores formed in Comparative Example 1 are widely distributed by having diameters of 0.5 to 2.2 nm, whereas most of micropores formed in Experimental Example 1 have diameters of about 1.5 to 2.0 nm that are near an average value.

A specific surface area of Comparative Example 1 was 1,100 m$^2$/g, and a specific surface area of Experimental Example 1 was 1,500 m$^2$/g. As the specific surface area (m$^2$/g) of Experimental Example 1 was wide as large as about 36% compared to the specific surface area of Comparative Example 1, it was generally expected that a toluene ($C_7H_8$) absorption capability of Experimental Example 1 compared as the adsorption breakthrough time (min) was more excellent as much as about 36% than that of Comparative Example 1.

However, a result was derived that the toluene absorption capability of Experimental Example 1 was more excellent as much as about 333% than that of Comparative Example 1 since it took 52 seconds to reach an adsorption breakthrough point that was a saturated adsorption state in Comparative Example 1, and it took 225 seconds to reach the adsorption breakthrough point in Experimental Example 1.

Through this, it could be confirmed that controlling the diameter distribution of micropores was more important in harmful substance-removing capacity than the simple specific surface area.

Experimental Example 2-2. Nitrogen Oxide (NO$_x$) Removing Experiment

In order to check the removal effect of nitrogen oxides of Example 1, an experiment of removing nitrogen oxides (NO$_x$) generated in an incineration environment was conducted.

After manufacturing an activated carbon fiber by using 3 parts by weight of silver based on 100 parts by weight of the activated carbon fiber as in Example 1 except that only the copper content was varied to 10 parts by weight and 20 parts by weight, a metal nanoparticles impregnated activated carbon fiber was manufactured in a nonwoven fabric form.

Equally, a controlling process was performed so that 1,200 ppm of nitrogen oxide (NO) might be constantly supplied, and an arm filled with a nonwoven fabric type copper-impregnated activated carbon fiber of Example 1 and a copper-impregnated activated carbon of Comparative Example 1 in a chimney connected to an incineration environment was allowed to be brought into contact with nitrogen oxides.

Figure 4:
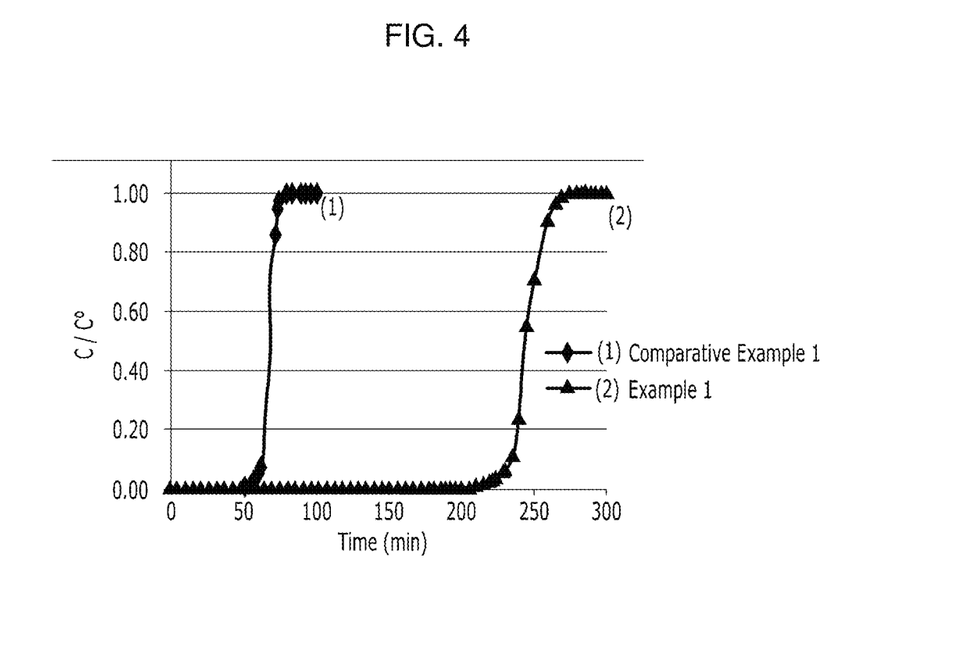
FIG. 4 is a graph showing experimental results of adsorbing a toluene gas according to the similar surface area Example (ACF) of the present disclosure, ACF shows far increased adsorption capacity.

The results are shown in FIG. 4.

As shown in FIG. 4, it is confirmed that the concentration of nitrogen oxides may be reduced from the point where the copper content reaches 3 parts by weight.

It is confirmed that a nitrogen oxide concentration of 200 ppm or less that is an environmental safety standard may be maintained for significant 60 seconds or more from the point where the copper content reaches 5 parts by weight.

Through this, it may be confirmed that a metal nanoparticles impregnated activated carbon fiber removes nitrogen oxides very effectively compared to a metal nanoparticles impregnated activated carbon, and it may be confirmed that the higher the metal content is, the more remarkably the removal rate of harmful substances such as nitrogen oxides is improved. Referring to FIG. 4, it may be confirmed that ACF is about four times more than AC in the toluene (Co=1200 ppm) adsorption capacity of AC and ACF with similar specific surface areas as C/Co=0.1, and (1) of the adsorption capacity (breakthrough curve) up to this point is about 55 min, whereas (2) of the adsorption capacity (breakthrough curve) is a level of 240 min.

Experimental Example 2-3. Measuring Antibacterial Activities of a Silver-Containing Activated Carbon Fiber Antibacterial activities were measured to check whether a silver-containing activated carbon fiber, i.e., Example 1 had an antibacterial function or not. *Escherichia coli* KCTC (Korean Collection for Type Culture) 1039 (*E-coli*) colon *bacillus* was used as an experimental strain.

After inoculating the strain into a tryptic soy (TS) broth, the strain inoculated into the TS broth was cultured at 30° C. for 15 to 18 hours. After inoculating 5 μl of a culture medium into 5 ml of a TS soft agar of 45° C., and suspending the culture medium inoculated into the TS soft agar, a suspension was applied to TS agar plates. Example 1 and Comparative Example 1 were each positioned in an amount of about 0.5 g on the surface of the agar plates. The agar plates having carrier placed thereon were cultured at 30° C. for 18 hours. A growth inhibition zone around Example 1 was identified.

After measuring microbial content reduction results over time, the measured microbial content reduction results are shown in the following Table 1.

TABLE 1

| Time (hr) | Comparative Example 1 Log cfu/ml ± S.D | Reduction % | Example 1 Log cfu/ml ± S.D | Reduction % |
|---|---|---|---|---|
| 0 | 7.32 ± 0.05 | 0.00 | 7.61 ± 0.08 | 0.00 |
| 5 | 7.32 ± 0.02 | 0.00 | 5.11 ± 0.31 | 99.68 |
| 10 | 7.31 ± 0.02 | 2.27 | 0.88 ± 0.44 | 99.99 |
| 15 | 7.27 ± 0.01 | 8.79 | | |

Figure 5:
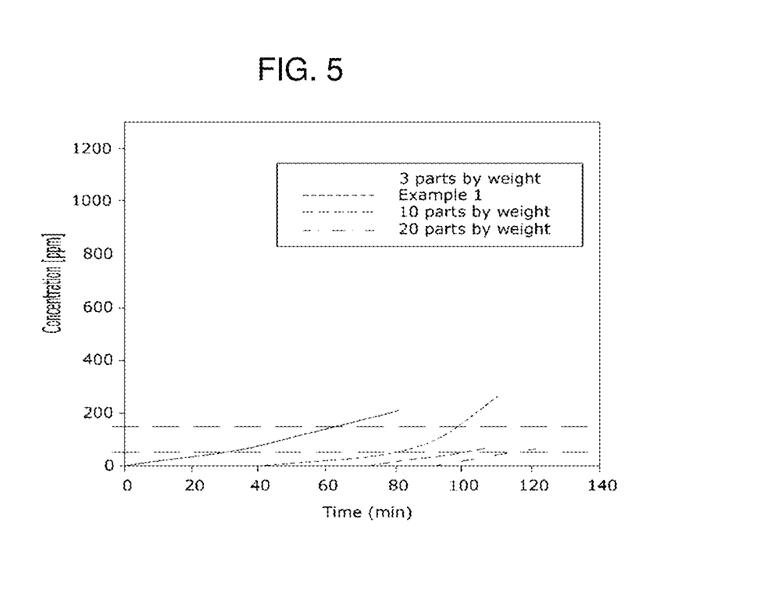
FIG. 5 is a graph showing experimental results of decomposing a nitrogen oxide (NO) according to an exemplary embodiment of the present disclosure.

It may be seen that almost all bacteria of 50% or more are annihilated within five hours in Example 1, but only about 8% of bacteria are annihilated after 15 hours in Comparative Example 1. Referring to FIG. 5, it may be seen that the breakthrough time increases until 150 ppm of NO gas is released according as the Cu impregnation amount increases when passing 1,200 ppm of NO gas through Cu nanoparticle-impregnated ACF at about 300° C.

Hereinabove, exemplary embodiments of the present disclosure have been described in detail. However, the scope of the present disclosure is not limited thereto, but various changes, equivalents, or modified forms of those skilled in the art using a basic concept of the present disclosure defined in the following claims are also within the scope of the present disclosure.

What is claimed is:

1. A method of manufacturing a metal nanoparticles impregnated activated carbon fiber, the method comprising:
    a precursor manufacturing step of manufacturing a precursor by needle-punching a waste carbon fiber;
    an activation step of manufacturing an activated carbon fiber having micropores formed therein by heat-treating the precursor including the waste carbon fiber under a mixed atmosphere of activation gases including water vapor, carbon monoxide, nitrogen, argon, helium, or combinations thereof; and
    a metal containing step of containing metal particles in the activated carbon fiber manufactured in the activation step.

2. The method according to claim 1, wherein, in the activation step, the activation gases include an oxidizing gas consisting of the water vapor and the carbon monoxide and a non-oxidizing gas consisting of the nitrogen, the argon, and the helium, and the oxidizing gas is obtained by mixing the water vapor and the carbon monoxide at a volume ratio of 1:1 to 1:9.

3. The method according to claim 1, wherein, in the metal containing step, the metal particles are contained in the activated carbon fiber by mixing and reacting the activated carbon fiber and a metal salt in a solvent.

4. The method according to claim 1, wherein the metal nanoparticles impregnated activated carbon fiber manufactured through the metal containing step has micropores formed therein, and is distributed so that the diameter distribution of the micropores satisfies a ratio of a micropore diameter standard deviation (σ)/a micropore average diameter value (nm) of more than 0.07 to less than 0.1.

5. The method according to claim 1, wherein, in the metal containing step, the metal particles are present in an amount greater than 3 parts by weight and less than 20 parts by weight based on 100 parts by weight of the activated carbon fiber.

6. The method according to claim 1, wherein, in the metal containing step, the metal includes any one or more selected from the group consisting of silver, titanium, nickel, manganese, cobalt, zinc, yttrium, copper, vanadium, molybdenum, chromium, and iron.

7. The method according to claim 1, wherein, in the metal containing step, nanoparticles of the metal are contained in the activated carbon fiber from a metal salt solution.

8. The method according to claim 1, further comprising a heat treatment step of heat-treating the activated carbon fiber after performing the metal containing step.

9. The method according to claim 1, wherein, in the activation step, the precursor is heat-treated at a temperature of more than 600° C. to less than 900° C.

10. The method according to claim 1, wherein the waste carbon fiber is at least one of a polyacrylonitrile-based waste carbon fiber, a cellulose-based waste carbon fiber, or a phenolic resin-based waste carbon fiber.

11. The method according to claim 1, wherein the activation gases further include carbon dioxide.

12. The method according to claim 3, wherein, in the metal containing step, the metal salt includes any one or more selected from the group consisting of a nitrate ($NO_3^-$) of metal, a hydroxide salt ($OH^-$) of metal, a chloride ($Cl^-$) of metal, and a sulfate ($SO_4^{2-}$) of metal.

13. The method according to claim 1, further comprising a staple fiber-forming step of forming staple fibers by cutting the waste carbon fiber before performing the precursor manufacturing step.

14. The method according to claim 8, wherein the heat treatment step comprises heat-treating the activated carbon fiber at a temperature of more than 200° C. to less than 300° C.

15. The method according to claim 8, wherein the heat treatment step is performed under a mixed atmosphere of inert gases including the nitrogen, the argon, the helium, or combinations thereof.

16. The method according to claim 8, wherein the heat treatment step is performed under a mixed atmosphere of gases including the water vapor, the nitrogen, the argon, the helium, or combinations thereof.

* * * * *